United States Patent
Øllgaard et al.

(10) Patent No.: US 11,781,313 B2
(45) Date of Patent: Oct. 10, 2023

(54) TOWER ELEMENT WITH PLATFORM AND FIXATION ELEMENT

(71) Applicant: Vestas Offshore Wind A/S, Aarhus N. (DK)

(72) Inventors: Børge Øllgaard, Esbjerg (DK); Peter Sigfred Mortensen, Risskov (DK); Jens Juul, Aarhus N (DK)

(73) Assignee: Vestas Wind Systems A/S, Aarhus N (DK)

( * ) Notice: Subject to any disclaimer, the term of this patent is extended or adjusted under 35 U.S.C. 154(b) by 209 days.

(21) Appl. No.: 17/312,681

(22) PCT Filed: Dec. 20, 2019

(86) PCT No.: PCT/EP2019/086515
§ 371 (c)(1),
(2) Date: Jun. 10, 2021

(87) PCT Pub. No.: WO2020/127867
PCT Pub. Date: Jun. 25, 2020

(65) Prior Publication Data
US 2022/0064937 A1     Mar. 3, 2022

(30) Foreign Application Priority Data

Dec. 20, 2018  (EP) ..................................... 18214510
Mar. 13, 2019  (EP) ..................................... 19162682

(51) Int. Cl.
*F03D 13/20*  (2016.01)
*E04B 1/38*  (2006.01)
*E04H 12/08*  (2006.01)

(52) U.S. Cl.
CPC ........... *E04B 1/388* (2023.08); *E04H 12/085* (2013.01); *F03D 13/20* (2016.05); *F05B 2230/604* (2013.01); *F05B 2260/301* (2013.01)

(58) Field of Classification Search
CPC ......... E04B 1/40; E04H 12/085; F03D 13/20; F05B 2230/604; F05B 2260/301
(Continued)

(56) References Cited

U.S. PATENT DOCUMENTS

2007/0125037 A1*  6/2007  Meiners ................... F03D 13/22
                                                        52/848
2010/0192504 A1*  8/2010  Willey .................... F03D 80/00
                                                        52/651.01
(Continued)

FOREIGN PATENT DOCUMENTS

CN          201021456 Y      2/2008
CN          101660485 A      3/2010
(Continued)

OTHER PUBLICATIONS

European Patent Office, Extended EP Search Report in EP Application No. 18214510.2, dated Jun. 14, 2019.
(Continued)

*Primary Examiner* — Brian E Glessner
*Assistant Examiner* — James J Buckle, Jr.
(74) *Attorney, Agent, or Firm* — Wood Herron & Evans LLP

(57) ABSTRACT

There is presented a tower element, such as a tower element for a tower for a wind turbine generator, said tower element comprising a hollow, tubular element, a flange on an inside surface of the hollow, tubular shell, a unit comprising a platform and a fixation element, such as a plurality of fixation elements, attached to the platform, wherein the unit is arranged with respect to the flange, so that the flange prevents movement of the platform in both directions along an axis being parallel with an axis of the tubular element, and movement of the platform is allowed in at least one direction along an axis being orthogonal to the axis of the (Continued)

tubular element. There is furthermore presented a tower, a wind turbine generator and a method for providing a tower element.

23 Claims, 7 Drawing Sheets

(58) Field of Classification Search
    USPC .......................................................... 52/283
    See application file for complete search history.

(56) References Cited

U.S. PATENT DOCUMENTS

| | | | | |
|---|---|---|---|---|
| 2011/0148116 | A1* | 6/2011 | Halstead | F03D 3/005 290/55 |
| 2013/0115054 | A1* | 5/2013 | Yokoyama | F03D 13/20 415/126 |
| 2015/0285225 | A1* | 10/2015 | Ollgaard | E04F 19/00 52/745.18 |
| 2019/0368473 | A1* | 12/2019 | Soerensen | F03D 13/20 |
| 2019/0390429 | A1* | 12/2019 | Winkes | E02B 17/027 |
| 2020/0158083 | A1* | 5/2020 | Nitsche | F03D 7/0296 |
| 2020/0166022 | A1* | 5/2020 | Soerensen | F03D 13/20 |
| 2022/0219269 | A1* | 7/2022 | Johansen | F03D 13/10 |
| 2022/0252048 | A1* | 8/2022 | Cerrada Garate | F16D 1/092 |
| 2022/0260057 | A1* | 8/2022 | Falkenberg | B66C 1/108 |

FOREIGN PATENT DOCUMENTS

| | | |
|---|---|---|
| CN | 107687398 A | 2/2018 |
| WO | 2014070084 A2 | 5/2014 |
| WO | 2018133964 A1 | 7/2018 |
| WO | 2018133965 A1 | 7/2018 |

OTHER PUBLICATIONS

European Patent Office, International Search Report and Written Opinion in PCT Application No. PCT/EP2019/086515, dated Apr. 1, 2020.

China National Intellectual Property Administration, office action issued in corresponding Chinese Application No. 201980091167.4, dated May 4, 2023, with English translation.

* cited by examiner

TOWER ELEMENT WITH PLATFORM AND FIXATION ELEMENT

FIELD OF THE INVENTION

The invention relates to a tower element and more particularly a tower element with a fixation element and a corresponding tower, wind turbine and method for providing a tower element with a platform.

BACKGROUND OF THE INVENTION

Tower elements, such as tower elements for wind turbines, may be provided with platforms, which may be advantageous for supporting equipment and personnel and/or may form a barrier against, e.g., liquids. Installation of platforms, however, is resource demanding, involves a risk of injuring the personnel installing the platform and may perform suboptimally.

Hence, an improved tower element, tower, wind turbine and method for providing a tower element with a platform would be advantageous, and in particular a tower element, a tower, a wind turbine and a method, which overcomes some or all of the problems mentioned above and enables an installation which is less resource demanding and/or risky and/or which performs better.

SUMMARY OF THE INVENTION

It may be seen as an object of the present invention to provide a tower element, a tower, a wind turbine and a method, which overcomes the problems mentioned above and enables an installation which is less resource demanding and/or risky and/or which performs better.

Thus, the above described object and several other objects are intended to be obtained in a first aspect of the invention by providing a tower element, such as a tower element for a tower for a wind turbine generator, said tower element comprising:
   a hollow, tubular element,
   a flange on an inside surface of the hollow, tubular shell,
   a unit comprising:
      a platform,
      a fixation element, such as a plurality of fixation elements, attached to the platform,
   wherein
      the unit is arranged with respect to the flange, so that:
         the flange prevents movement of the platform in both directions along an axis being parallel with an axis of the tubular element,
      and
         movement of the platform is allowed in at least one direction, such as two translational directions, along an axis being orthogonal to the axis of the tubular element.

The invention may be seen as particularly, but not exclusively, advantageous for obtaining a tower element with a platform which may be installed and fixed to a (single) flange with respect to movement in a direction parallel with an axis of the hollow, tubular element of the tower element, and which may nevertheless move in at least one direction orthogonal to said axis.

A possible advantage of the present invention may be that the position of the platform along the axis of the hollow, tubular element is fixed by the (single) flange. This may in turn be advantageous for enabling carrying out installation of the platform via attachment to a single flange, for enabling carrying out installation of the platform when the hollow, tubular element is in any orientation (such as the axis being non-vertical, such as substantially horizontal) and/or for enabling transportation of the tower element with the platform installed.

Another possible advantage is that the unit is installed to a flange, where it is noted that a flange may be simpler to attach to the hollow, tubular element than, e.g., a plurality of bushings (welding, check and preparation for paint is also more time consuming for spots, such as many spots, compared to a flange welding). Thus, installation to a (single) flange may reduce the amount of work required due to the simplicity of, e.g., welding a flange to the inside of the hollow, tubular element (a flange welding may be carried out as a relatively simple, automatable process). This may in particular be relevant for large inner diameters of the hollow, tubular element, such as said diameter being equal to or larger than 2 meter, such as equal to or larger than 4 meter, such as equal to or larger than 6 meter, such as equal to or larger than 8 meter, such as equal to or larger than 10 meter. Optionally said diameter may in any case be equal to or smaller than 12 meter.

Another possible advantage is that the fixation with respect to the (single) flange renders it superfluous to adjust fixation elements, such as fixation elements between welded bushings and a platform in case of a platform hanging from bushings, because the unit can simply be placed to abut the flange in one single operation.

Another possible advantage is that movement of the platform is allowed in at least one direction, such as two translational directions, along an axis being orthogonal to the axis of the tubular element, which may allow a tower with the tower element to oscillate to some extent without moving the unit and/or may allow the cross-sectional shape of the tower to be somewhat non-circular (such as during storage, transport, installation and/or use) without deforming or stressing the unit. Another possible advantage may be, that since the unit may experience forces applied from an inside wall of the hollow, circular element and in a direction away from said wall, these forces may effectively (automatically) serve to position the unit in a centre of the hollow, tubular element. This effectively centralizing force may in turn be advantageous for avoiding that the unit remains in contact with the inner wall of the hollow, tubular element, where friction and stress arising from contact forces may cause damage, wear and/or noise.

Another possible advantage may be that the flange itself may serve to structurally strengthen the tower element, such as so that the force required for deforming the hollow, tubular element is increased. The hollow, tubular element may thus appear stiffer, which may serve to reduce a manufacturing ovality, which may in turn assist during the manufacturing process and enable reducing tolerances.

By 'hollow, tubular element' may be understood an element suitable as a tower element or the shell of a tower element. The hollow, tubular element may extend at least 15 meter, such as at least 20 meter, such as at least 30 meter, such as at least 36 meter, along its axis. Optionally said hollow, tubular element may in any case extend at most 40 meter along its axis. The hollow, tubular element may in particular be understood to be suitable as an element of a tower, where the element is placed above ground level and/or sea level at the site of the tower. The hollow, tubular element may be understood to be substantially rotationally symmetrical, such as rotationally symmetrical, such as a cross-section in a plane comprising the axis of the hollow, tubular element, being rotationally symmetrical, such as circularly symmetrical.

By 'axis of hollow, tubular element' is understood longitudinal axis, such as an axis around which the hollow, tubular element is substantially rotationally symmetric, such as rotationally symmetric.

By 'platform' may be understood a structural element suitable for being mounted in the hollow, tubular element and serve as a platform for carrying personnel and/or equipment. It may extend throughout a substantial amount, such as cover at least 50%, of the inner cross-section of the tubular element. It may be made of metal.

By 'fixation element' is understood a structural element, which is arranged to interact with the flange and the platform so as to at least partially (such as at least in one direction along the axis of the tubular element) fix the platform with respect to the flange. The 'fixation element' may be understood to be a rigid structural element, such as where 'rigid' is understood as rigid for practical purposes, such as non-deforming during normal use), such as having a Young's modulus of at least 1 GPa. The fixation element may be monolithical or may comprise several parts joined together reversibly or permanently. The fixation element may comprise, such as consist of, polymer, such as nylon or polyoxymethylene (POM). The fixation element may have dimensions (e.g., in the directions radial×tangential×axial with reference to the tubular element) within [60-240 mm]×[45-180 mm]×[25-100 mm]. Alternatively, the fixation element may have dimensions (e.g., in the directions X×Y×Z, where Z is parallel with a hole for accommodating a bolt) within [100-400 mm]×[75-300 mm]×[25-100 mm].

By 'unit' is understood an element which may be, such as is, coherent (i.e., holding together) and would remain coherent (such as joined via a bolt) even in the absence of the flange and the hollow, tubular element. An advantage of having a unit comprising the platform and the fixation element may be, that it enables assembling said unit in the absence of the flange and the hollow, tubular element, which may in turn enable mounting of the unit at the flange (mounted on the tubular element) in a single operation, such as opposed to placing the platform at the flange in a first operation and mounting the fixation units in a second operation. The unit may comprise openings, such as openings for traversing unit, elevators, ladders and stairways or inspection of elements on the opposite side of the unit, such as via hatches in the platform. The unit may in particular comprise the platform and a plurality of fixation elements, where the a plurality of fixation elements are each attached to the platform via a bolt.

'Flange' is understood as is common in the art, such as a projecting (and optionally flat) rim, collar, or rib on an object, serving for attachment and not necessarily limited to flanges for increasing strength. The flange is understood to be a coherent, such as a monolithic, element. The flange is understood to substantially encircle, such as encircle by 360° and/or form a closed loop around, an axis of the hollow, tubular element. The flange is understood to be substantially rotationally symmetrical, such as rotationally symmetrical, such as a cross-section in a plane comprising the axis of the hollow, tubular element, being rotationally symmetrical, such as circularly symmetrical. The flange is understood to be spaced apart with respect to each end of the hollow, tubular element, such as a smallest distance with respect to an end of the hollow, tubular element being at least 1%, such as at least 5%, such as at least 10%, such as at least 15%, such as at least 20%, such as at least 25%, of a total length of the hollow tubular element along an axis of the hollow, tubular element and/or such as a smallest distance with respect to an end of the hollow, tubular element being at least 0.5 m, such as at least 1 m, such as at least 2 m, such as at least 5 m, such as at least 10 m, such as at least 15 m, such as at least 20 m, such as at least 25 m. The flange is understood to not being an end-flange of the hollow, tubular element.

Movement of the platform is in particular embodiments allowed in two translational directions (orthogonal to each other) along axes being orthogonal to the axis of the tubular element. Rotational motion around all three Cartesian axis may be blocked. Blocking rotational motion may be advantageous for allowing wires, etc., to traverse the platform, e.g., in a direction parallel with the axis of the tubular element, without being twisted.

By 'prevent movement' may be understood that movement is prevented for practical purposes, such as during normal use. Any substantial movement, such as movement via application of excessively large forces, entails elastic deformations and/or irreversible deformation of flange, platform and/or fixation element.

By 'allow movement' may be understood that movement can take place without entailing irreversible deformation of flange, platform and/or fixation element and possibly without elastic deformation of flange, platform and/or fixation element. Movement, such as translational movement orthogonal to the axis of the tubular element, may in particular take place by 'sliding' in the plane orthogonal to the axis of the tubular element, such as in the plane of the flange.

The unit may be arranged to be fluid tight, such as inhibiting flow of fluid from one side of the unit to the other side of the unit in a direction along the axis of the tubular element. This may increase safety due to prevention of dangerous flow of oil and isolation of e.g. corrosion to one (identified) place.

One or more buffer elements, such as wherein a buffer element is an element with a smaller Young's modulus than each of the platform and the hollow, tubular element may be placed between the platform and the hollow, tubular element, such as placed in a plane orthogonal to the axis of the hollow, tubular element, which plane intersects the platform. The one or more buffer elements may be placed so as to abut both platform and hollow, tubular element in case platform is moved sufficiently close to the hollow, tubular element in a direction from the platform to the hollow, tubular element through the one or more buffer elements. The one or more buffer elements may be one or more highly flexible bands or tubes that resides in, such as fills, a space between the hollow, tubular element and the platform and may be arranged to prevent matter to get trapped inside the space between the platform and tubular element and/or to absorb forces applied between platform and hollow, tubular element.

According to an embodiment, there is presented a tower element wherein the unit abuts the flange at least at two points of contact including:
    a first point of contact where the flange inhibits movement of the unit in a first direction along an axis being parallel to the axis of the tubular element,
    a second point of contact where the flange inhibits movement of the unit in a second direction along an axis being parallel to the axis of the tubular element,
    where the second direction is opposite the first direction, and where a vector formed by projecting a vector from the first point of contact to the second point of contact onto an axis of the hollow, tubular element, is parallel with the first direction.

The first and second point of contact may be on either side of the flange, such as the flange being in between parts of the unit on an axis being parallel with an axis of the tubular element. The unit pinches or grips around the flange. A possible advantage of this may be that installation is simple because it merely requires a simple flange and then arranging the unit to pinch or grip, such as above and below in an axial direction, the flange. Another possible advantage is that is renders it possible to fix the platform axially via attachment to a single flange, because contact forces, such as compressive contact forces, applied by the flange on the unit in both directions prevents movement in both directions. Thus, it may be possible to prevent axial motion in both axial directions by exclusively attaching the unit to the flange. In some embodiments, the unit is exclusively attached to the flange. By 'parallel' is understood the opposite of anti-parallel, i.e., by parallel is understood parallel and in the same direction.

A possible advantage of this embodiment may be that the unit may be arranged to grab or pinch around (such as above and below in an axial direction) the flange tightly enough that the total structure (tubular element, flange and unit) can be moved together by application of a force on some or all of these parts of the total structure, yet simultaneously loose enough, that some parts are moved with large acceleration in a direction orthogonal to the axis of the tubular element, e.g., when the tubular element (such as a wind turbine tower) is oscillating laterally, such as at high frequencies, then the platform can slide ("float") and not follow the movements of the tubular element. The grabbing or pinching of the unit around the flange may furthermore be arranged to be loose enough that ovalization of the tubular element can be accommodated, such as the tubular element can change shape without stressing the unit.

According to an embodiment, there is presented a tower element wherein the unit and the flange are forming a sliding fit, such as a transition fit or an interference fit.

'Sliding fit' is understood as is common in the art, such as a fit for mechanical parts that slide on one another. By 'sliding fit' may in particular be understood two mating parts, which are arranged so as to allow motion by sliding in at least one direction during normal use. By 'sliding fit' may in particular be understood that the parts are arranged so as to substantially fit each other, such as fit each other to a degree that a first part will be in contact with a second part on both sides (such as the flange being in contact with the unit on both sides of the flange with respect to an axial direction), while relative movement by sliding in one or two dimensions (such as one or two translational dimensions orthogonal to the axial direction) is not prevented. Alternatively, 'sliding fit' may be understood as an arrangement of two parts, where relative, translational, motion between the two parts is inhibited along at least one, such as one, translational dimension, while sliding movement is being allowed in at least one other translational dimension, such as in two translational dimensions. A sliding fit may be advantageous for preventing axial movement while allowing movement orthogonal to the axis. Another possible advantage may be that sliding motion may be arranged without involving a restoring force. For example, if the unit slides from position A to position B there may be a frictional force during sliding, but there need not be a force, such as a spring force applied in position B. This may be advantages if position B is actually the optimal—for example the central—position. Another possible advantage may be that sliding motion can be combined with a restoring force, e.g., by arranging a resilient member, such as a rubber element or a spring, between the unit and the flange. For example, if the unit slides from position A to position B there may be a force, such as a spring force directed from A to B and applied in position B. This may be advantages if position A is actually the optimal—for example the central—position.

According to an embodiment, there is presented a tower element wherein the unit comprises a bolt, such as a bolt with an axis substantially parallel, such as parallel, with the axis of the tubular element, which bolt intersects at least a surface of each of the fixation element and the platform and prevents relative, translational movement of the fixation element relative to the platform in directions orthogonal to the axis of the tubular element.

A possible advantage may be that while translational movement is prevented, relative rotational movement may be allowed during installation (and alternatively by loosening of the bolt). In embodiments, the fixation element has hole, such as a through-going or non-through-going hole, for accommodating the bolt, and at least part of this hole may be dimensioned with an inner radius of the unstressed hole being smaller than an outer radius of the bolt. This may be advantageous for allowing the hole and the bolt to form a friction fit or an interference fit (such as a fit, which is so tight that the parts are held together by the fit). Either of the hole in the platform and the fixation element may be through-going or non-through-going, and the embodiment encompasses sub-embodiments, such as wherein there is no through-going hole in the platform and the bolt comes from below platform (the side with the fixation element)—through the fixation element and connects to a nut welded to the platform, or such as wherein the bolt comes from above the platform (the side opposite the side with the fixation element)—through a through-going hole in the platform to a final position with the lowest part of the bolt below platform level.

In alternative embodiments, the bolt is replaced with a pin, such as a fit-pin. Such pins might be advantageous for rendering it possible to attach the fixation element to the unit exclusively from the same side of the platform as the unit is placed.

According to an embodiment, there is presented a tower element wherein the fixation element comprises
    a first portion within a first interval along the axis of the tubular element, which portion comprises no parts, which are further away from the bolt in a first radial direction ($v_1$)
    away from the axis of the bolt, and
    away, such as directly away, from the axis of the tubular element,
    than a first distance ($d_1$), and
    a second portion within a second interval along the axis of the tubular element, wherein the first interval and the second interval are not overlapping, which portion comprises parts, which are further away from the bolt in the first radial direction, than a second distance ($d_2$),
where the second distance is larger than the first distance, such as 10 mm or more larger, such as 20 mm or more larger, such as 30 mm or more larger, such as 40 mm or more larger, such as 50 mm or more larger, such as 60 mm or more larger, such as 70 mm or more larger, such as 80 mm or more larger, such as 90 mm or more larger, such as 100 mm or more larger, such as 120 mm or more larger, such as 150 mm or more larger, such as 200 mm or more larger.

A possible advantage of this may be that it enables the unit to pinch or grip around (such as above and below in an axial direction) the flange. More particularly, the first portion may be placed adjacent to the flange and the second portion may then be brought to overlap with the flange as observed in an axial direction. When arranged so that the platform overlaps with the flange as observed in an axial direction (on one side of the flange) and the fixation part overlaps with the flange as observed in a radial direction (on the other side of the flange), the unit can be fixed to the flange in an axial direction by pressing the platform and the fixation element together in an axial direction, e.g., by tightening the bolt holding them together.

The directions are understood to be radial directions, such as away from the axis of the tubular element and away from the axis of the bolt. It is understood that projections onto this axis may be included (i.e., the projection of parts onto said axis are to be taken into account, even if they are not situated on that axis). The first interval and the second interval may by non-overlapping and optionally abutting. The first interval may have a length corresponding to, such as being within 90-110% of, such as equal to, a dimension of the flange in a direction parallel with the axis of the tubular element. In an embodiment, the first interval may have a length being smaller than, such as being within a range of 50-99% of, such as within 75-95% of, a dimension of the flange in a direction parallel with the axis of the tubular element.

By 'directly' away from an axis is understood the direction away which is anti-parallel with a direction directly towards the axis.

The part of the second portion extending beyond the first distance may have a surface, such as a surface abutting the flange during normal use, which (in the absence of stress due to force applied by the flange) is not orthogonal to the axis of the tubular element. An advantage of this surface being slightly non-horizontal may be that it enables realizing an interference/friction fit around flange (e.g., in case the surface is tilting towards the flange in a direction away from the bolt) and/or that it yields a centralizing force on the platform (e.g., in case the surface tilts away from the flange in a direction away from the bolt). The tilt can also be controlled to enable a pre-defined horizontal (orthogonal to axis) friction.

Any of the minimum values above may be combined with a maximum value of at most 500 mm larger. For example, the minimum value of "10 mm or more larger", may be combined with the maximum value of "at most 500 mm larger" to form the interval from 10 mm to 500 mm larger.

According to an embodiment, there is presented a tower element wherein the first portion comprises parts, which are further away from the bolt in a second radial direction ($v_2$) than a third distance ($d_3$), wherein the second radial direction is
away from the axis of the bolt, and
within an angular interval of ]0°; −90°[or ]0°; 90°[, such as ]−10°; −80°[or ]10°; 80°[, around the axis of the bolt, with respect to the first angular direction,
where the third distance is larger than the first distance, such as 10 mm or more larger, such as 20 mm or more larger, such as 30 mm or more larger, such as 40 mm or more larger, such as 50 mm or more larger, such as 60 mm or more larger, such as 70 mm or more larger, such as 80 mm or more larger, such as 90 mm or more larger, such as 100 mm or more larger, such as 120 mm or more larger, such as 150 mm or more larger, such as 200 mm or more larger.

A possible advantage of this embodiment is that it allows rotating the fixation element into place (such as allows rotation bringing the fixation element from a position/orientation where it is not overlapping with the flange in an axial view to a position/orientation where it is not overlapping with the flange in an axial view)—and automatically stopping/blocking rotation, which in turns allows tightening of bolt from the opposite side with respect to the fixation element, i.e., from one side only.

Any of the minimum values above may be combined with a maximum value of at most 500 mm larger. For example, the minimum value of "10 mm or more larger", may be combined with the maximum value of "at most 500 mm larger" to form the interval from 10 mm to 500 mm larger.

According to an embodiment, there is presented a tower element wherein the second portion comprises no parts, which are further away from the bolt in a third radial direction ($v_3$) than a fourth distance ($d_4$), wherein the third radial direction is
away from the axis of the bolt, and
different with respect to the first radial direction, such as within an angular interval of ]0°; 360°[, such as ]+10°; −10°[, around the axis of the bolt, with respect to the first angular direction,
where the fourth distance is smaller than the second distance, such as 10 mm or more smaller, such as 20 mm or more smaller, such as 30 mm or more smaller, such as 40 mm or more smaller, such as 50 mm or more smaller, such as 60 mm or more smaller, such as 70 mm or more smaller, such as 80 mm or more smaller, such as 90 mm or more smaller, such as 100 mm or more smaller, such as 120 mm or more smaller, such as 150 mm or more smaller, such as 200 mm or more smaller.

A possible advantage may be that it allows moving the fixation element past the flange in an axial direction, and then subsequently rotating it into place, such as allows rotation bringing the fixation element from a position/orientation where it is not overlapping with the flange in an axial view to a position/orientation where it is not overlapping with the flange in an axial view.

In case this embodiment is combined with the previous embodiment, the angles and distances should be arranged accordingly, e.g., the second and third directions should be non-coincident (v2≠v3) and the third distance should be larger than the fourth distance (d3>d4) in order to allow orientation so that axial movement of fixation element past flange is possible and then rotation of fixation element so as to allow a part of the fixation element to block rotation via contact force applied by flange.

Any of the minimum values above may be combined with a maximum value of at most 500 mm smaller. For example, the minimum value of "10 mm or more smaller", may be combined with the maximum value of "at most 500 mm smaller" to form the interval from 10 to 500 mm smaller.

According to an embodiment, there is presented a tower element wherein the platform has a hole for accommodating the bolt, said hole being delimited around its axis by a wall, such as wherein there is a groove in said wall, and wherein a resilient member, such as a spring or an O-ring, is arranged between the bolt and the wall, such as in said groove, so as to exert a force, such as a static friction force and/or a restoring force, upon the bolt keeping it in place in the absence of application of a force on the bold exceeding a threshold force.

A possible advantage may be that movement of the bolt (relative to platform) requires application of a force overcoming the force applied by the resilient member, i.e., the bolt stays in place until a sufficiently large force is (deliberately) applied. For example, a static friction force and/or a restoring force may be arranged to be sufficient to inhibit movement by gravity and/or insufficient for inhibiting movement by a manually applied force.

This embodiment may be particularly advantageous during installation, where it allows a first fixation of the fixation elements to the platform, where the first fixation is relatively less tight than a second fixation, but where the first fixation is tight enough, that the fixation elements are kept in place translationally and rotationally by the resilient member. This may be advantageous because it allows the position and orientation according to the first fixation to be maintained, even if gravity exerts forces and torques on the fixation element. This may in particular be advantageous if the angular orientation of the fixation elements in the first fixation allows them to be moved past the flange in an axial direction, after which an applied force (e.g., applied manually and/or via a power tool) can exceed the threshold force and rotate the fixation element into a position allowing the unit to engage with the flange, after which a second fixation can take place, which second fixation is relatively tighter with respect to the first fixation.

The hole in the platform for accommodating the bolt may be non-through-going and may in particular be realized by a nut attached to a plate of the platform. Alternatively, the hole in the platform for accommodating the bolt may be through-going and the bolt may fully intersect and traverse the platform and intersect a least a surface of the fixation element.

According to an embodiment, there is presented a tower element wherein the flange is encircling the axis of the hollow, tubular element. This may be advantageous for one or more of ease of installation of the flange, ease of installation of the unit and structural robustness of the tower element.

According to an embodiment, there is presented a tower element wherein the flange is placed between ends of the hollow, tubular element and placed away from each end with respect to an axis being parallel with the axis of the hollow, tubular element. This may be advantageous for enabling flexibility in the position along the axis of the hollow, tubular element of the unit in the tower element and/or for avoiding spatial conflicts with an end flange of the tower element.

According to a second aspect, there is presented a tower, such as a tower for a wind turbine, said tower comprising one or more tower elements according to the first aspect.

The tower may be hollow, tubular, have solid walls, a substantially circular, such as circular, cross-section and/or may comprise a plurality of units. The tower may be suitable for carrying a wind turbine.

The position of the flange, such as any position of the tower element, may be understood to be above ground level and/or sea level at the site of the tower.

According to an embodiment, there is presented a tower, wherein the tower along its largest dimension is 30 meter or more, such as 50 meter or more, such as 75 meter or more, such as 100 meter or more, such as 150 meter or more, such as 200 meter or more.

The present invention may be particularly advantageous for large tower. For example, large towers entail large forces and it becomes increasingly important avoid the elements being heavier than necessary in order to avoid increasing the (harmful) forces. The present invention may be advantageous for keeping the mass associated with the platform to a minimum since merely a flange and fixation elements (such as very light, polymeric fixation elements) may be necessary for fixing it to the tubular element. Another possible advantage may be that for large towers, ovalization becomes a problem (including during manufacturing and transportation of the tubular elements and the tower elements), and the flange may serve to increase stiffness and aid in reducing ovalization. Another possible advantage, which may be particularly relevant for large towers is that installation can be realized from one side, which may be beneficial both for effectiveness and for safety. Another possible advantage may be that the flange may allow a relatively simple installation (both because installation of the flange itself is relatively simple and because fixing the unit relative to the flange is relatively simple), for example as opposed to a platform being fixed to a plurality of bushings and/or tensioned elements.

Any of the minimum values above may be combined with a maximum value of at most 250 m. For example, the minimum value of "30 m or more", may be combined with the maximum value of "at most 250 m" to form the interval from 30 m to 250 m.

According to a third aspect, there is presented a wind turbine, wherein the wind turbine is comprising a tower according to the second aspect.

Wind turbine is generally known in the art and may in general also be referred to as a wind turbine generator (WTG).

The wind turbine may be a wind turbine with a power rating of 100 kW or more, such as 200 kW or more, such as 400 kW or more, such as 600 kW or more, such as 800 kW or more, such as 1 MW or more, such as 2 MW or more, such as 4 MW or more, such as 6 MW or more, such as 8 MW or more, such as 10 MW or more. The wind turbine may be a horizontal axis wind turbine. The wind turbine may have three-blades.

According to a fourth aspect, there is presented a method for providing a tower element, such as a tower element according to the first aspect, such as a tower element for a tower for a wind turbine generator, with a platform, said method comprising providing:
    a hollow, tubular element,
    a flange on an inside surface of the hollow, tubular element,
    a unit comprising:
        the platform,
        a fixation element, such as a plurality of fixation elements, attached to the platform,
said method further comprising:
    arranging the unit relative to the hollow, tubular element so that the flange prevents relative movement of the unit with respect to the flange in a first direction along the axis of the tubular element, and so that the fixation element comprises a portion extending beyond the flange in the first direction,
    Rotating the fixation element so that at least some of the portion extending beyond the flange in the first direction is arranged so that the flange prevents relative movement of the unit with respect to the flange in a second direction along the axis of the tubular element, where the second direction is opposite the first direction,
    Fixing the fixation element relative to the platform so as to fix the fixation element in a position wherein:

the flange prevents movement of the platform in both directions along an axis being parallel with an axis of the tubular element, and movement of the platform is allowed in at least one direction along an axis being orthogonal to the axis of the tubular element.

A possible advantage of this method may be that it facilitates that a unit may be provided before installation of the platform, which unit may be attached to the tubular element via the (single) flange. A possible advantage may be that the method provides a simple and efficient, yet effective way of assembling a tower element with a platform.

It may be understood that the step of providing the platform and the fixation element may result in a coherent unit. It may furthermore be understood that the step of fixing the fixation element relative to the platform may result in a coherent unit wherein the step of fixing increases a threshold force or torque necessary for adjusting the relative orientation and/or position between the platform and the fixation element and the platform. For example, the step of providing the unit may comprise loosely assembling the platform and fixation element with a bolt (optionally with a resilient member in a groove in the platform for applying a static friction force and/or a restoring force to the bolt with respect to the fixation element), and the step of fixing may comprise tightening the bolt.

According to an embodiment, there is presented a method wherein fixing the fixation element relative to the platform so as to prevent movement of the platform in both directions along an axis being parallel with an axis of the tubular element, is carried out by (optionally sequentially)

rotating the fixation element into an angular position where further rotation is blocked, such as by a part of the fixation element being blocked by contact forces upon abutting the flange, such as thereby subsequently passively applying an oppositely directed torque to the fixation element, and rotating a bolt by actively applying a torque to a bolt on one side of the platform.

The present embodiment may be advantageous in that it encompasses rotation of the fixation element into a position where further rotation is blocked, such as by part for fixation element abutting the flange, and then (subsequently) pulling the platform and fixation element together and gripping around the flange by tightening of the bolt, which may be carried out by applying a torque to the head of the bolt (optionally from the side of the platform opposite the fixation element, where the blocked rotation serves to provide the oppositely directed torque necessary for allowing the bolt to engage with the internal nut threading of the fixation element leading to the tightening). In other words, said fixing may involve a step of rotating the bolt and fixation element until rotation of fixation element is halted by interaction between fixation element and flange or tubular element, where after further rotation of the bolt leads to tightening of connection between fixation element and platform without movement between fixation element and tubular element.

A possible advantage of this may be that it enables rotating said bolt by applying the torque from (only) one side of the platform (on the axial axis). Thus, the platform can be placed so as to abut the flange with the fixation elements on the same side of the platform as the flange. Subsequently, a bolt intersecting the platform may be addressed from the side opposite the platform with respect to the fixation element, and rotated so as to turn the fixation element. Subsequently, when a part of the fixation element abuts the flange, further rotation is blocked and the bolt can then be tightened. A possible advantage is that the process comprising rotating the fixation element into position and tightening the bolt can be done exclusively via the bolt. A possible advantage of this, is that safety is increased because it is not required to contact the fixation element with, e.g., a hand or fingers, in order to rotate it, i.e., these limbs can be kept out of this area where large forces may present a hazardous environment.

According to an embodiment, there is presented a method wherein fixing the fixation element relative to the platform so as to prevent movement of the platform in both directions along an axis being parallel with an axis of the tubular element, is carried out while an axis of the tubular element is non-vertical, such as within an angular range of [−45; +45] around horizontal, such as substantially horizontal, such as within an angular range of [−10; +10] around horizontal, such as horizontal.

A possible advantage may be that it allows installation while tubular elements are arranged on the ground in a horizontal orientation and furthermore allows for subsequent movement/transportation of the tower elements with the platform mounted in its final position. This may be particularly beneficial in combination with the feature of allowing in-plane movement (movement of platform relative to the flange in one, such as two directions orthogonal to the axis of the tubular element) because this movement aids in accommodating ovalization of the tubular element, which may occur during transport and/or when the tubular element is in a substantially horizontal position for example due to exposure to wind induced vibration.

According to an embodiment, there is presented a method, wherein providing the unit comprises:

fixing a plurality of fixation elements to the platform, wherein each fixation element is fixed to the platform via a bolt so that rotation of the fixation element around the axis of the bolt requires overcoming a threshold torque ($\tau_r$), which exceeds a torque ($\tau_g$) applied by gravity around the axis of the bolt, wherein the step of rotating the fixation element comprises:

applying to the bolt, such as where the point of attack on the bolt is on the opposite side of the platform with respect to the fixation element, an applied torque ($\tau_a$) above the threshold torque thereby rotating bolt and fixation element.

A possible advantage of this embodiment may be that it enables providing the unit where the fixation elements are in a fixed position and orientation as long as merely gravity acts upon them. However, when a larger force, such as an applied torque is (deliberately) applied, the fixation elements may nevertheless be rotated, such as rotated into place during installation so as to enable fixing the unit to the flange in the axial direction. The threshold torque, such as a restoring force and/or a static friction force, may be realized in a plurality of ways, such as via a groove in the platform with an O-ring or a spring arranged to hold the bolt.

According to an embodiment, there is presented a method wherein the method comprises providing the tower element in an orientation wherein the axis of the hollow, tubular element is substantially horizontal, such as horizontal, and subsequently placing a buffer element, such as a rubber ball or preferably a flexible tube, between the platform and the hollow, tubular element, such as placed in a plane orthogonal to the axis of the hollow, tubular element, which plane intersects the platform.

A possible advantage of this may be that the buffer element can absorb some of the forces applied between unit and flange in a direction orthogonal to the axis of the tubular element, in particular in cases where these elements would otherwise touch in a possibly damaging way. Another possible advantage may be that the buffer element may serve to apply a restoring force to the unit, such as to keep it centralized in the tubular element. The buffer element may be a rubber ball or a rubber tube. The buffer element may be understood to be flexible, such as elastically deformable, such as with a smaller Young's modulus than each of the platform and the hollow, tubular element.

According to an embodiment, there is presented a method wherein providing a flange on an inside surface of the hollow, tubular element, comprises attaching, such as welding, the flange to the inside surface of the hollow, tubular element. It may be advantageous to attach a flange, such as with respect to, e.g., attaching a plurality of discrete elements, such as bushings. For example, a flange welding may be carried out in an efficient, and optionally automated manner.

According to an embodiment, there is presented a method wherein the tower element (such as the tower element comprising the hollow, tubular element, the flange on an inside surface of the hollow, tubular element, and a unit) is transported subsequent to fixing the fixation element relative to the platform so as to prevent movement of the platform in both directions along an axis being parallel with an axis of the tubular element.

By 'transported' is understood moved physically, such as from position A to position B where, A and B are separated, such as separated horizontally, such as being spaced apart horizontally by at least 1 m, such as at least 10 m, such as at least 100 m, such as at least 1 km. It may be advantageous to first fix the fixation element relative to the platform so as to prevent movement of the platform in both directions along an axis being parallel with an axis of the tubular element, and then subsequently transport the tower element, e.g., because this allows the fixation to take place at a position A, e.g., at a factory or a production site, which is particularly suited for this task, and then assembly of a tower comprising the tower element at a position B, which is particularly suited for housing the tower, such as the tower with a wind turbine generator.

The first, second, third and fourth aspect of the present invention may each be combined with any of the other aspects. These and other aspects of the invention will be apparent from and elucidated with reference to the embodiments described hereinafter.

BRIEF DESCRIPTION OF THE FIGURES

The tower element and corresponding tower, wind turbine and method for providing a tower element according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
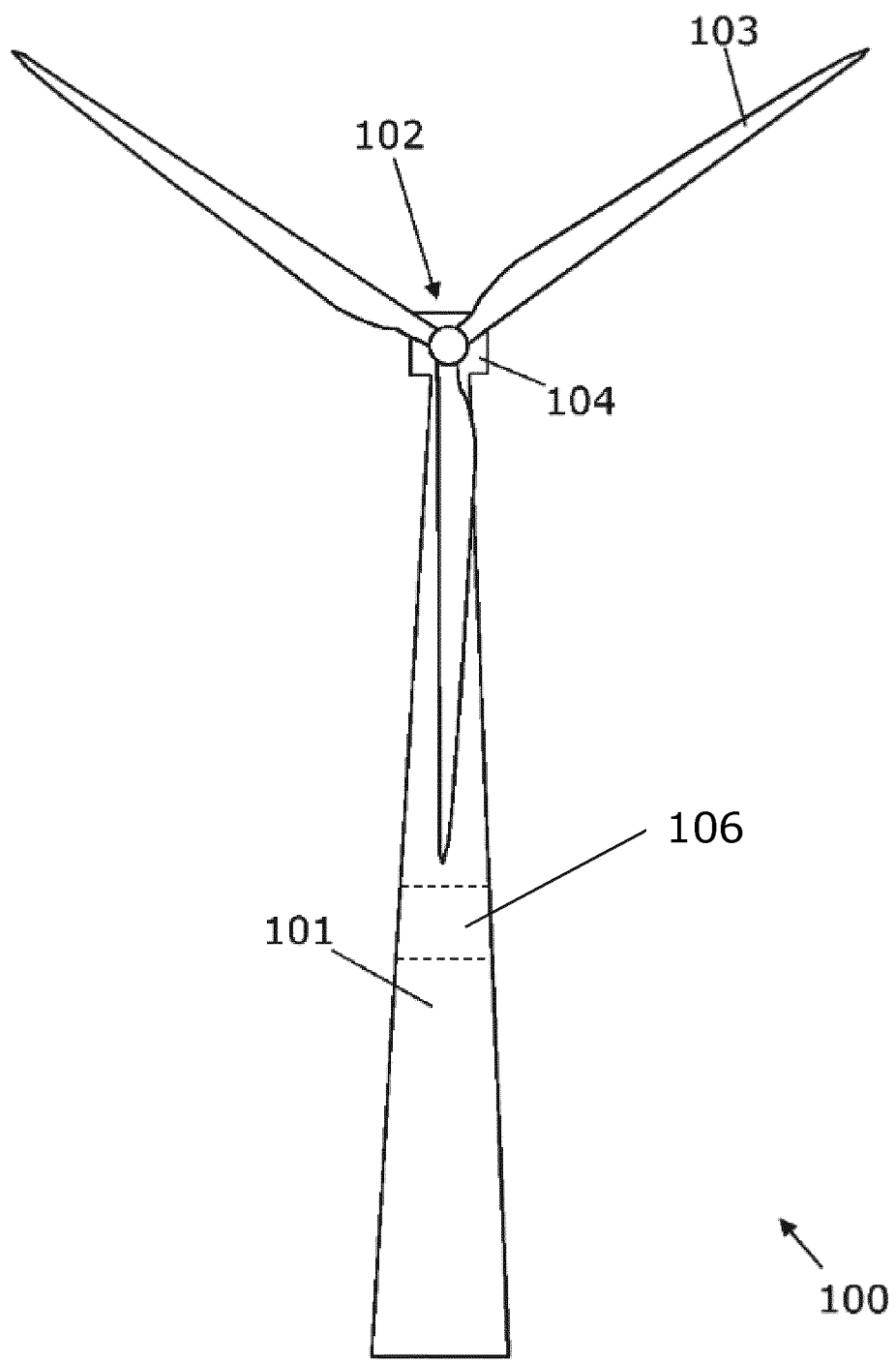
FIG. 1 shows a wind turbine 100.

FIG. 1 shows a wind turbine 100 (which may also be referred to as a wind turbine generator (WTG)) comprising a tower 101 and a rotor 102 with at least one rotor blade 103, such as three blades and a nacelle 104. The tower 101 comprises a plurality of hollow, tubular elements, such as hollow, tubular element 106 indicated between the dashed horizontal lines.

Figure 2:
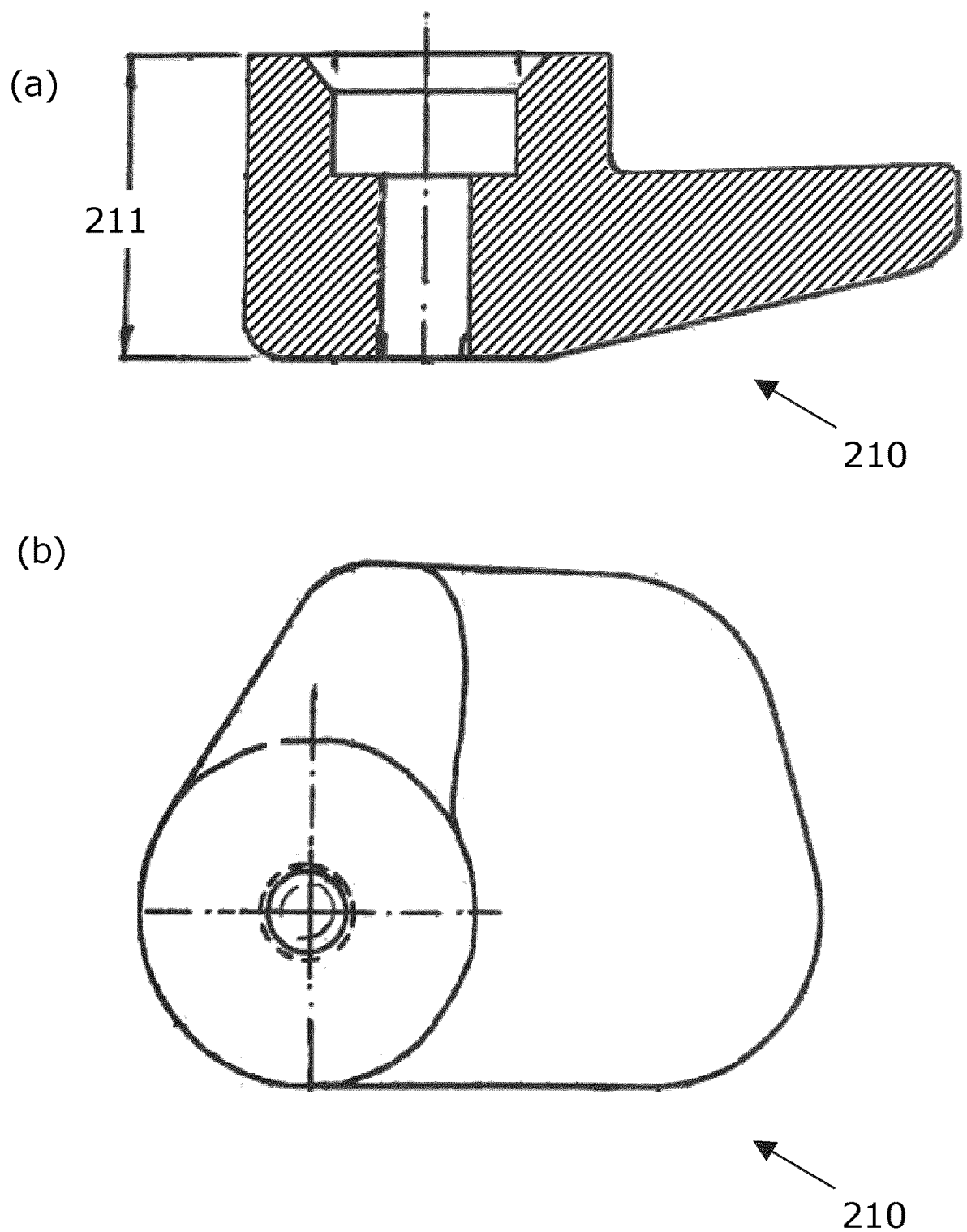
FIG. 2 shows technical drawings of the fixation element 210.

FIG. 2 shows technical drawings of the fixation element 210. In the top of the drawing (a) there is shown a side view, such a observed in a direction orthogonal to the axis of the tubular element and the bolt, wherein an upwards direction in the drawing is a direction towards the flange and the platform. A dimension 211 ("height") in the axial direction is indicated. In the bottom of the drawing (b) there is shown a top view, such as observed in a direction parallel with to the axis of the tubular element and the bolt, and more particularly in a direction from (or through) the platform and the flange. The figure shows a hole for the bolt.

Figure 3:
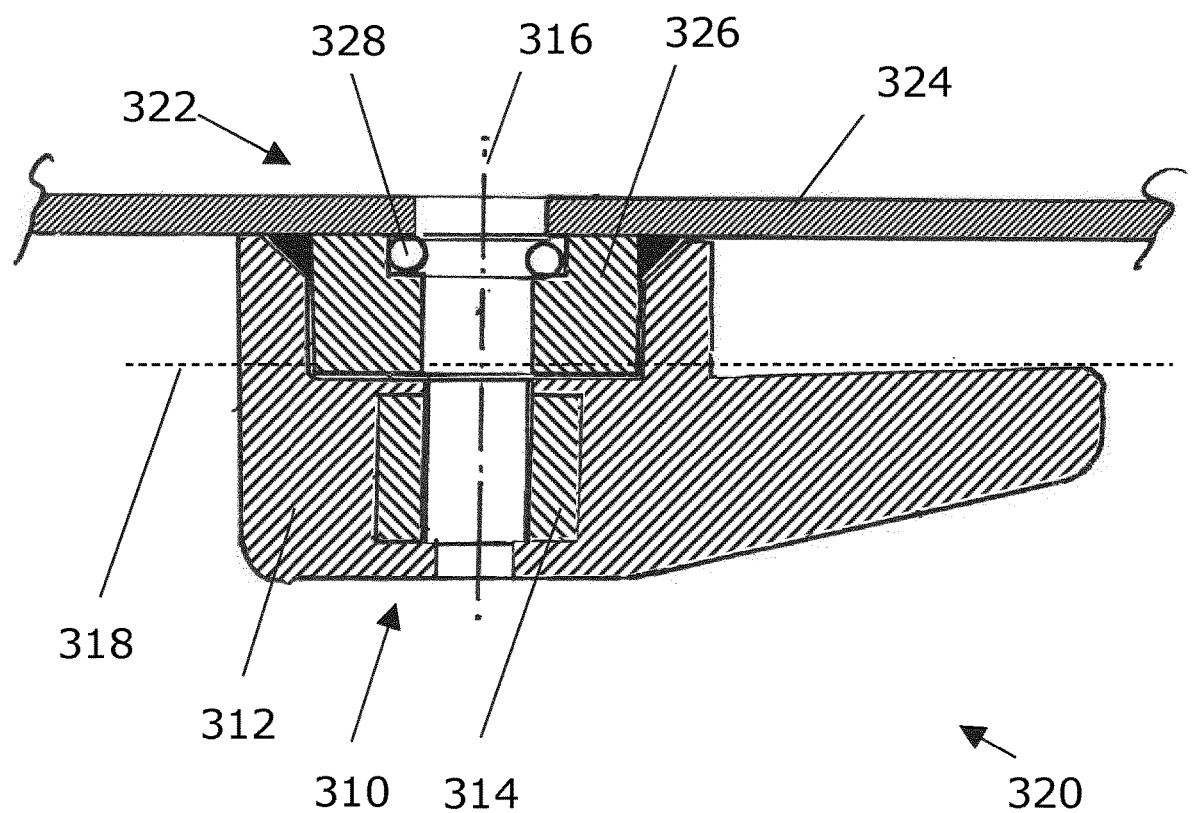
FIG. 3 shows a part of the unit 320 with fixation element 310 attached to the platform 322.

FIG. 3 shows a part of the unit 320 with fixation element 310 attached to the platform 322 via a bolt, or other similar member (not shown). The fixation element comprises a polymeric part 312 and a metallic, hollow, circular cylindrical insert 314 (such as a nut) for engaging with the bolt, which has axis 316, illustrated as a central axis. The fixation element has a through-going hole for accommodating the bolt. In one embodiment, the opening in the polymeric part below the insert 314 has a smaller inner diameter than the outer diameter of the bolt, so that when the bolt is tightened it cuts its way through the polymer ensuring a tight fit. The platform 322 comprises a plate 324 and a nut 326 welded to the plate for engagement with the bolt. The platform furthermore is arranged with a groove, and the unit comprises a resilient member, such as a spring or rubber band 328, in the groove for engaging with the bolt and keeping it in place during transport and installation. The horizontal dashed line 318 separates a first portion of the fixation element (above the dashed line 318) within a first interval along the axis of the tubular element (which is parallel with the axis 316 of the bolt), and a second portion within a second interval along the axis of the tubular element. The right hand side of the second portion extends beyond (further away from the axis of the bolt) than the first portion. The upper surface of the right hand portion may be non-horizontal, and in this embodiment it tilts slightly upwards. In other embodiments, it tilts slightly downwards.

Figure 4:
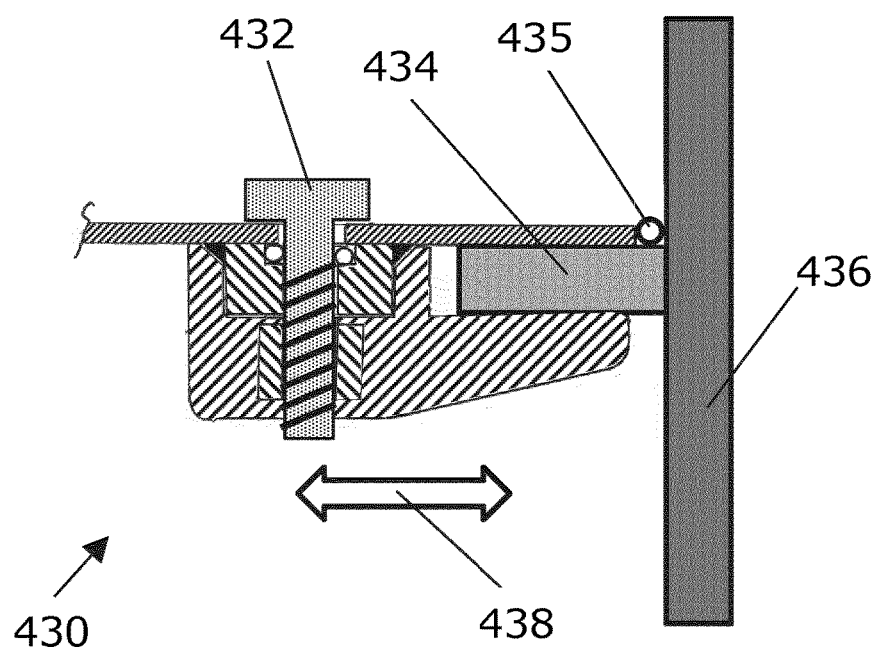
FIG. 4 shows a part of a tower element 430.

FIG. 4 shows a part of a tower element 430 comprising a hollow, tubular element 436, a flange 434 attached, such as welded, to the tubular element 436, and the unit 310 of FIG. 3 attached to the flange 434 via a bolt 432. The figure shows that the plate 324 of the platform 322 abuts a buffer element in the form of a flexible, rubber tube 435, which in turn abuts the tubular element 436. Relative movement between the unit 320 and the tubular element 436 is allowed as indicated by the double-headed arrow 438, although at some point upon compressing the buffer element 435, movement towards each other is no longer possible. The figure shows that the plate 324 of the platform 322 abuts the flange 434 at a first point at an upper side of the flange 434 and the polymeric part of the fixation element 310 abuts the flange at a second point at an opposite side of the flange 434 with respect to an axial direction (i.e., on either side of a plane orthogonal to the axial direction). The bolt is shown fully traversing each of the platform and the fixation element through through-going holes in each of the platform and the fixation element. In alternative embodiments, each or both of the holes for the bolt in the platform and the fixation element are non-through-going. For example, the hole in the platform may be a non-through-going hole realized by not having a hole in the plate 324 but merely having the hole arranged as the hole in the nut 326, which might be advantageous for rendering the need for alignment between the hole in the plate and the nut superfluous.

Figure 5:
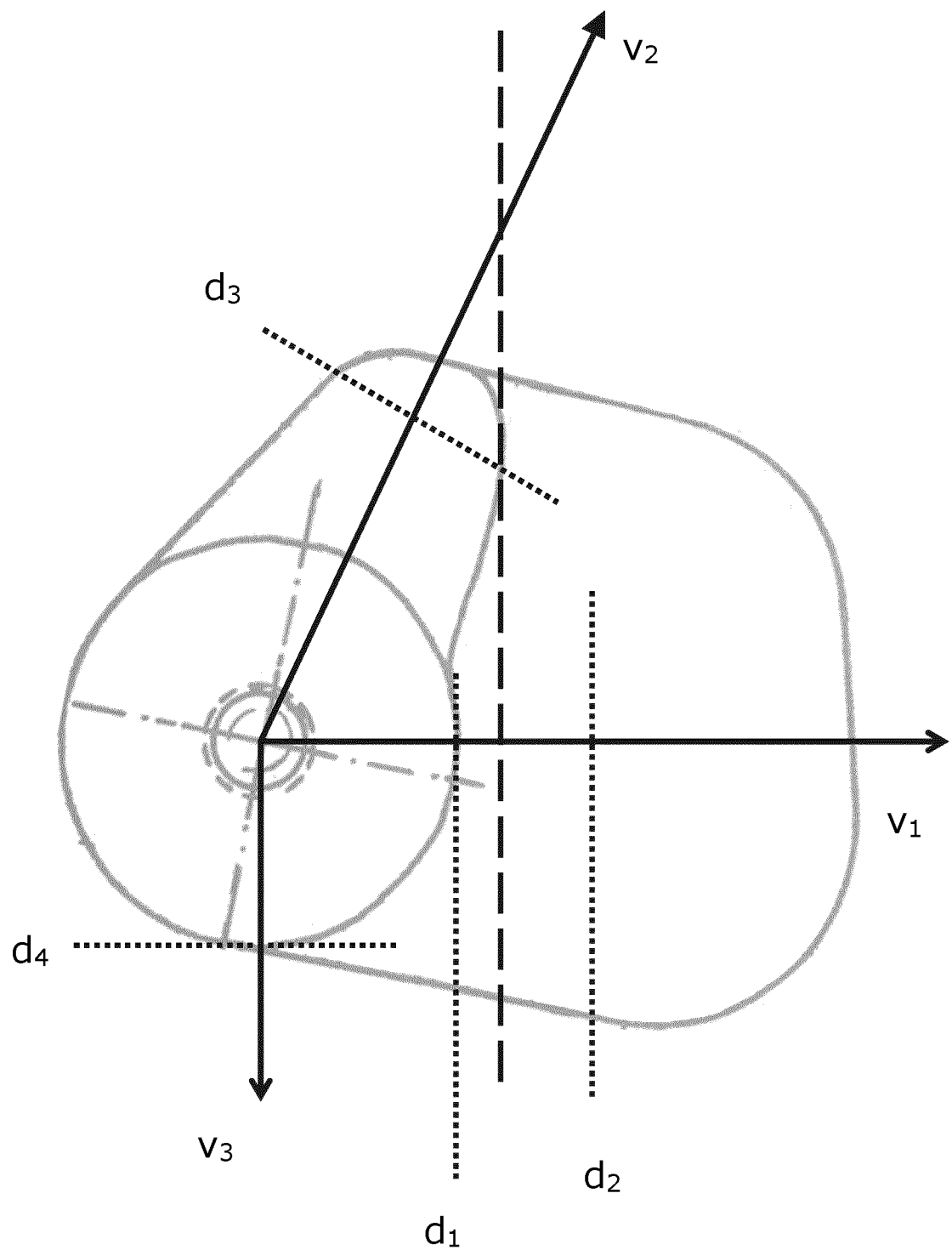
FIG. 5 illustrates directions and distances of the fixation element.

FIG. 5 illustrates directions and distances of the fixation element, and more particularly a first radial direction given by the direction of a first vector ($v_1$), a first distance ($d_1$), a second distance ($d_2$), a second radial direction given by the direction of a first vector ($v_2$), a third distance ($d_3$), a third radial direction is given by the direction of a first vector ($v_3$) and a fourth distance ($d_4$). The part around the axis (see also perspective view in FIG. 7) is shown as being circularly cylindrical with radius $d_4$. In other embodiments, this part is not circular cylindrical (as observed in the top view similar to FIG. 2(b) and FIG. 5), but may for example be elliptical. In such other embodiments, a size of that part in a direction from the axis of the bolt in a direction of the flange may decrease during rotation during mounting (see also FIGS. 6(a)-(c)), so that initially (cf., e.g., FIG. 6(a) a size in a direction of the flange is relatively larger than said distance upon rotation (cf., e.g., FIG. 6(b)-(c)). An advantage of such decrease in distance may be that the fixation element may be arranged to abut the flange initially (cf. FIG. 6(a)), but then during rotation the surface of said part is due to the non-circularity moved away from the flange and further contact is avoided, which may for example be beneficial for reducing or eliminating friction during rotation.

Figure 6:
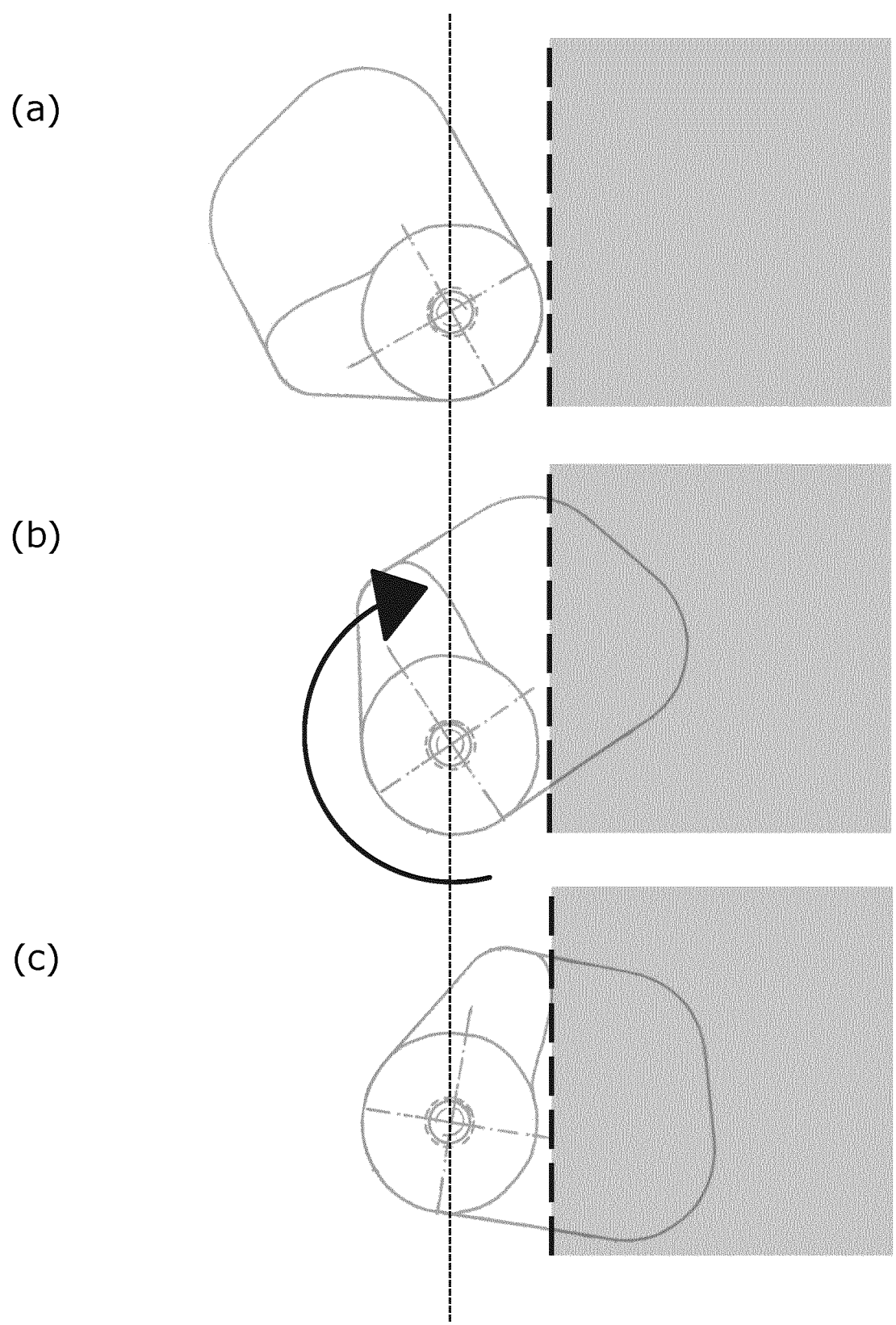
FIG. 6 illustrates a method according to an embodiment of the invention.

FIG. 6 illustrates a method according to an embodiment of the invention, where the method is illustrated by three snapshots (a)-(c) at different points in time during installation. Each snapshot is a top view as observed in an axial direction, such as from a top of the hollow, tubular element. The fixation element is mounted on the platform (not shown). The flange is indicated by the thick, dashed line, which is an edge of the flange, where the flange is on the right hand side. In the first shapshot (a) the unit with the fixation element in a first angular orientation around the axis of the bolt is being moved in an axial direction (such as along an axis orthogonal to the plane of the paper) and the fixation, so that at least a part of the fixation element is moved past the axial position of the flange and so that at least a part of the unit, such as the platform is brought to abut the flange so that the flange prevents further movement of the unit in that axial direction. In the next shapshot (b) the unit is abutting the flange at the first point of contact and the fixation element is rotated around the axis of the bolt by rotating the bolt in a tightening direction so that the unit has parts on both sides of the flange in an axial direction. In the last snapshot (c) the fixation element is rotated into its final position by continued rotating the bolt where after the unit is tightened and fixed onto the flange by further rotating the bolt. It is understood that the flange is sandwiched between parts of the unit, for example so that a fictitious line in an axial direction may intersect first the platform, then the flange and finally the fixation element. The flange thus fixes the position of the unit in the axial direction, but it allows movement in directions orthogonal to the axial direction.

Figure 7:
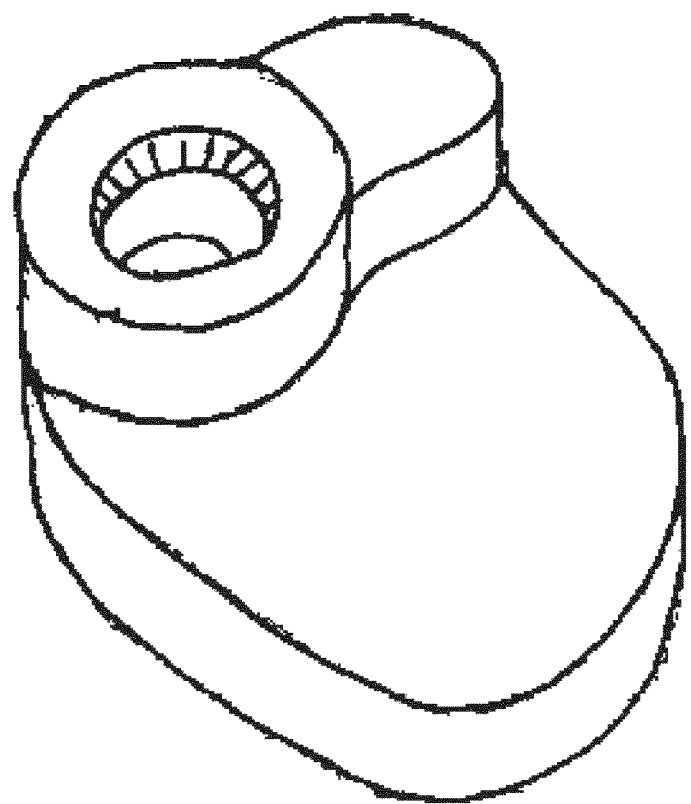
FIG. 7 shows perspective views of the fixation element.

FIG. 7 shows a perspective view of the fixation element, which is also shown in FIGS. 2, 5 and 6.

Figure 8:
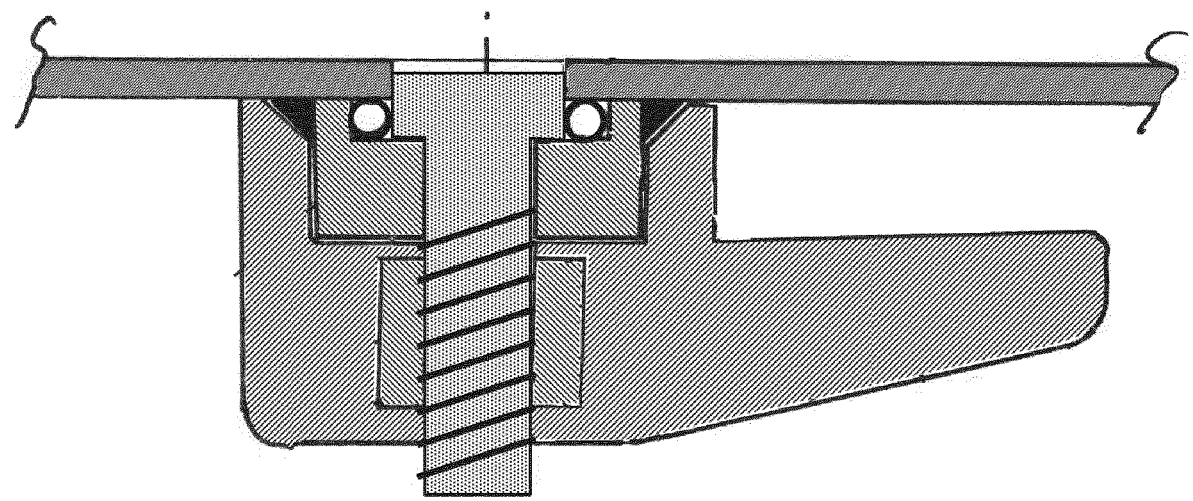
FIG. 8 shows a part of a tower element.

FIG. 8 shows a part of a tower element similar to FIG. 4 except that the platform, fixation unit and bolt are arranged so that no part of the bolt extends further in one axial direction, such as the direction opposite the fixation element, than the platform. This may be preferred for safety reasons as no bolt head sticks above the level of the platform, which may in turn reduce a risk of tripping.

Figure 9:
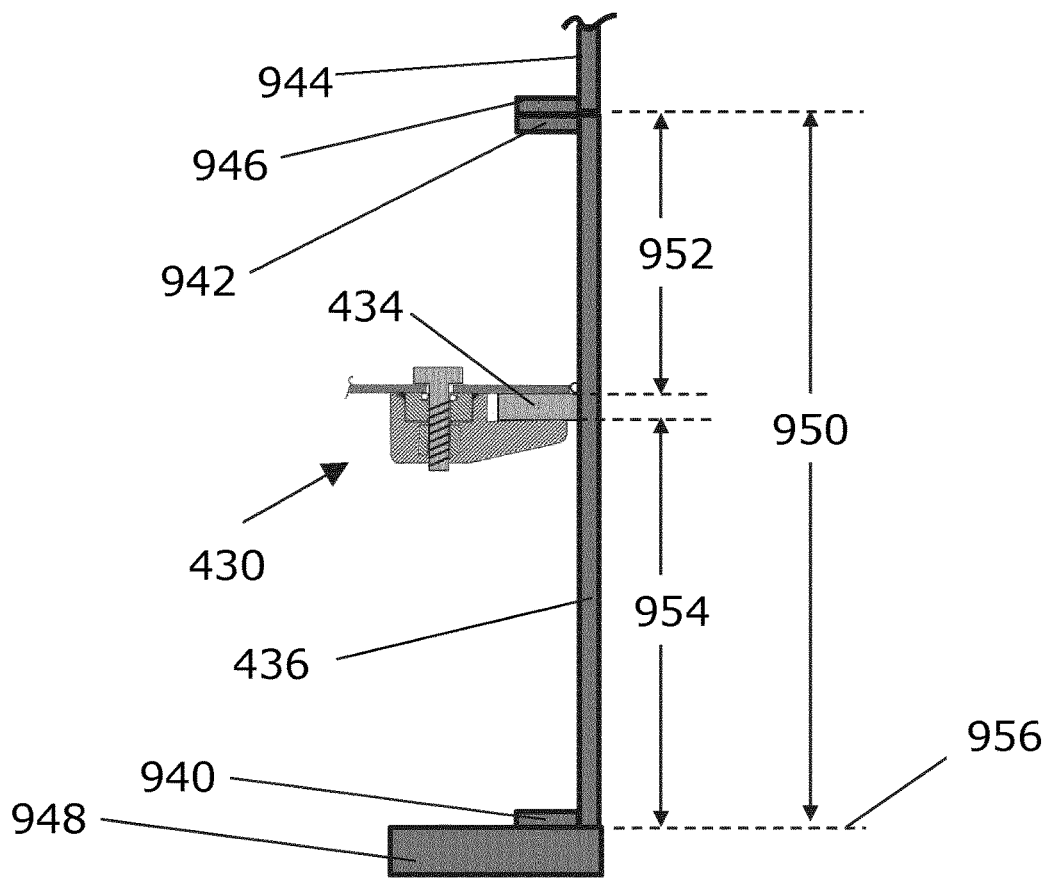
FIG. 9 shows parts of a tower element and adjacent elements.

FIG. 9 shows parts of a tower element 430 (as in FIG. 4) and adjacent elements, in particular an adjacent (upper) tower element 944 and an adjacent (lower) foundation 948. The flange 434 is understood to be spaced apart with respect to each end of the hollow, tubular element 436, such as a smallest distance with respect to an end of the hollow, tubular element (such as the smallest distance amongst a first distance 952 from the (closest part of the) flange 434 to a first (top) end of the hollow, tubular element 436 and a second distance 954 from the (closest part of the) flange 434 to a second (bottom) end of the hollow, tubular element 436) being at least a certain non-zero percentage of a total length 950 of the hollow tubular element along an axis of the hollow, tubular element and/or such as a certain non-zero distance. The flange 434 is not being an end-flange of the hollow, tubular element, such as wherein an end flange, may be a lower end-flange 940 or an upper end-flange 942. The adjacent (upper) tower element 944 is coupled to the tower element 436 via flanges 942, 946. The tower element 436 is coupled to the adjacent (lower) foundation 948 via the lower end-flange 940. A lower end of the tower element 436 may be flush with a plane 956 being equal to or above a ground level and/or a sea level.

Figure 10:
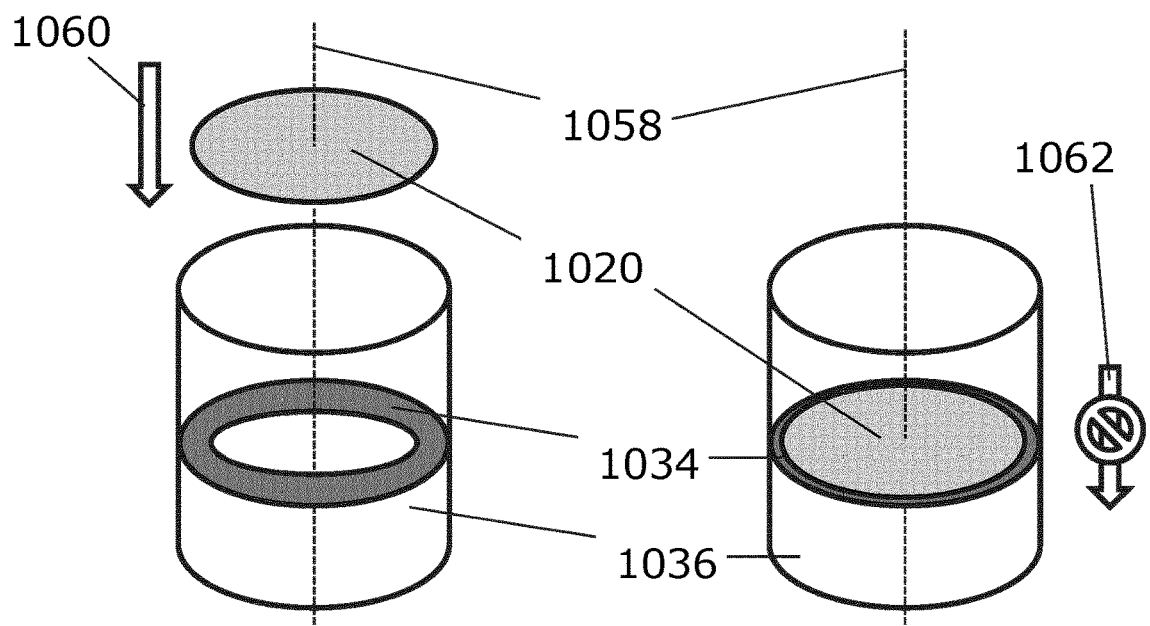
FIG. 10 shows is a schematic illustrating assembly of the unit.

FIG. 10 shows is a schematic illustrating assembly of the unit. The flange 1034 is a monolithic element. The flange 1034 is completely encircling (360°) and forming a closed loop around the axis 1058 of the hollow, tubular element 1036. A cross-section of the flange 1034 in a plane comprising the axis 1058 of the hollow, tubular element 1036, is circularly symmetrical. The left-hand side (a) of FIG. 10 furthermore shows a part of a process of arranging the unit 1020 relative to the hollow, tubular element 1036, where the arrow 1060 indicates a direction of movement relative to the hollow, tubular element 1036 and flange 1034 in a direction along an axis being parallel with the axis 1058 of the tubular element 1036. The right-hand side (b) of FIG. 10 furthermore shows the unit 1020 being placed relative to the hollow, tubular element 1036 and flange 1034, so that the flange prevents further movement of the platform in the direction indicated with arrow 1060 and wherein the prevented further movement is indicated by arrow 1062 with the overlaid "no" symbol. In FIG. 10, the tubular element 1036 is shown with the axis 1058 being vertical, but it could have been any orientation, such as horizontal, i.e., during installation of assembly and/or transportation, the axis 1058 could be any orientation. When placed in a tower, the orientation of axis 1058 is substantially vertical, such as vertical. Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A tower element for a tower of a wind turbine generator, comprising:
   a hollow, tubular element,
   a flange on an inside surface of the hollow, tubular element,
   a unit comprising:
      a platform, and
      at least one fixation element attached to the platform, the at least one fixation element being rotatable relative to the platform,
   wherein the unit is arranged with respect to the flange, so that:
      the flange prevents movement of the platform in both directions along an axis being parallel with an axis of the tubular element, and
      movement of the platform is allowed in at least one direction along an axis being orthogonal to the axis of the tubular element.

2. The tower element according to claim 1, wherein the unit abuts the flange at least at two points of contact including:
   a first point of contact where the flange inhibits movement of the unit in a first direction along an axis being parallel to the axis of the tubular element, and
   a second point of contact where the flange inhibits movement of the unit in a second direction along an axis being parallel to the axis of the tubular element,
   where the second direction is opposite the first direction, and where a vector formed by projecting a vector from the first point of contact to the second point of contact onto an axis of the hollow, tubular element, is parallel with the first direction.

3. The tower element according to claim 1, wherein the unit is arranged with respect to the flange, so that:
   the flange prevents movement of the platform in both directions along an axis being parallel with an axis of the tubular element, and
   movement of the platform is allowed in at least one direction along an axis being orthogonal to the axis of the tubular element, by:
      the unit being arranged relative to the hollow, tubular element so that the flange prevents relative movement of the unit with respect to the flange in a first direction along the axis of the tubular element, and so that the fixation element comprises a portion extending beyond the flange in the first direction, and
      the fixation element being rotated so that at least some of the portion extending beyond the flange in the first direction is arranged so that the flange prevents relative movement of the unit with respect to the flange in a second direction along the axis of the tubular element, where the second direction is opposite the first direction.

4. The tower element according to claim 3, wherein the fixation element being rotated so that at least some of the portion extending beyond the flange in the first direction is arranged so that the flange prevents relative movement of the unit with respect to the flange in a second direction along the axis of the tubular element, where the second direction is opposite the first direction, can be provided by:
   rotating the fixation element about a central axis of a member wherein the portion extending beyond the flange in the first direction, extends further away from the central axis of the member than another portion of the fixation element.

5. The tower element according to claim 4, wherein a horizontal dashed line separates a first portion of the fixation element within a first interval along the axis of the tubular element, and a second portion within a second interval along the axis of the tubular element, and the second portion extends beyond and further away from the central axis of the member than the first portion.

6. The tower element according to claim 1, wherein the unit and the flange are forming a sliding fit.

7. The tower element according to claim 1, wherein the unit comprises a bolt with an axis substantially parallel with the axis of the tubular element, which bolt intersects at least a surface of each of the fixation element and the platform and prevents relative, translational movement of the fixation element relative to the platform in directions orthogonal to the axis of the tubular element.

8. The tower element according to claim 7, wherein the fixation element comprises:
   a first portion within a first interval along the axis of the tubular element, which portion comprises no parts, which are further away from the bolt in a first radial direction ($v_1$) away from the axis of the bolt, and away from the axis of the tubular element, than a first distance ($d_1$), and
   a second portion within a second interval along the axis of the tubular element, wherein the first interval and the second interval are not overlapping, which portion comprises parts, which are further away from the bolt in the first radial direction, than a second distance ($d_2$), where the second distance is larger than the first distance.

9. The tower element according to claim 8, wherein the first portion comprises parts, which are further away from the bolt in a second radial direction than a third distance, wherein the second radial direction is:
   away from the axis of the bolt, and
   within an angular interval of [0°, −90°] or [0°, 90°], around the axis of the bolt, with respect to the first angular direction,
   where the third distance is larger than the first distance.

10. The tower element according to claim 8, wherein the second portion comprises no parts, which are further away from the bolt in a third radial direction than a fourth distance, wherein the third radial direction is:
   away from the axis of the bolt, and
   different with respect to the first radial direction, where the fourth distance is smaller than the second distance.

11. The tower element according to claim 7, wherein the platform has a hole for accommodating the bolt, said hole being delimited around its axis by a wall, and wherein a resilient member is arranged between the bolt and the wall, so as to exert a force upon the bolt and keeping it in place in the absence of application of a force on the bolt exceeding a threshold force.

12. The tower element according to claim 1, wherein the flange is encircling the axis of the hollow, tubular element.

13. The tower element according to claim 1, wherein the flange is placed between ends of the hollow, tubular element and placed away from each end with respect to an axis being parallel with the axis of the hollow, tubular element.

14. A wind turbine tower comprising one or more tower elements according to claim 1.

15. A wind turbine comprising the tower according to claim 14.

16. A method for providing a tower element for a tower of a wind turbine generator, said method comprising providing:
a hollow, tubular element,
a flange on an inside surface of the hollow, tubular element,
a unit comprising:
a platform,
at least one fixation element attached to the platform, the at least one fixation element being rotatable relative to the platform,
said method further comprising:
arranging the unit relative to the hollow, tubular element so that the flange prevents relative movement of the unit with respect to the flange in a first direction along the axis of the tubular element, and so that the fixation element comprises a portion extending beyond the flange in the first direction,
rotating the fixation element relative to the platform so that at least some of the portion extending beyond the flange in the first direction is arranged so that the flange prevents relative movement of the unit with respect to the flange in a second direction along the axis of the tubular element, where the second direction is opposite the first direction, and
fixing the fixation element relative to the platform so as to fix the fixation element in a position wherein:
the flange prevents movement of the platform in both directions along an axis being parallel with an axis of the tubular element, and
movement of the platform is allowed in at least one direction along an axis being orthogonal to the axis of the tubular element.

17. The method according to claim 16 for providing a tower element, wherein fixing the fixation element relative to the platform so as to prevent movement of the platform in both directions along an axis being parallel with an axis of the tubular element, is carried out by;

rotating the fixation element into an angular position where further rotation is blocked by a part of the fixation element being blocked by contact forces upon abutting the flange and thereby subsequently passively applying an oppositely directed torque to the fixation element, and
rotating a bolt by actively applying a torque to a bolt on one side of the platform.

18. The method according to claim 16 for providing a tower element, wherein fixing the fixation element relative to the platform so as to prevent movement of the platform in both directions along an axis being parallel with an axis of the tubular element, is carried out while an axis of the tubular element is non-vertical.

19. The method according to claim 16 for providing a tower element, wherein:
providing the unit comprises:
fixing a plurality of fixation elements to the platform, wherein each fixation element is fixed to the platform via a bolt so that rotation of the fixation element around the axis of the bolt requires overcoming a threshold torque, which exceeds a torque applied by gravity around the axis of the bolt,
wherein the step of rotating the fixation element comprises:
applying to the bolt an applied torque above the threshold torque thereby rotating bolt and fixation element.

20. The method according to claim 16, wherein the method comprises
providing the tower element in an orientation wherein the axis of the hollow, tubular element is substantially horizontal and
subsequently placing a buffer element between the platform and the hollow, tubular element.

21. The method according to claim 16, wherein providing a flange on an inside surface of the hollow, tubular element, comprises attaching the flange to the inside surface of the hollow, tubular element.

22. The method according to claim 16, wherein the tower element is transported subsequent to fixing the fixation element relative to the platform so as to prevent movement of the platform in both directions along an axis being parallel with an axis of the tubular element.

23. The method according to claim 16, wherein rotating the fixation element so that at least some of the portion extending beyond the flange in the first direction is arranged so that the flange prevents relative movement of the unit with respect to the flange in a second direction along the axis of the tubular element, is provided by;
rotating the fixation element about a central axis of a member wherein the portion extending beyond the flange in the first direction extends further away from the central axis of the member than another portion of the fixation element.

* * * * *